United States Patent [19]

Hess

[11] Patent Number: 4,794,635
[45] Date of Patent: Dec. 27, 1988

[54] TWO-WAY RADIO COMMUNICATION SYSTEM WITH MAX-MINIMUM CALL ASSIGNMENT METHOD

[75] Inventor: Garry C. Hess, Hanover Park, Ill.

[73] Assignee: Motorola, Inc., Schaumburg, Ill.

[21] Appl. No.: 936,927

[22] Filed: Nov. 28, 1986

Related U.S. Application Data

[63] Continuation-in-part of Ser. No. 893,059, Aug. 4, 1986, abandoned.

[51] Int. Cl.$^4$ .............................................. H04Q 7/04
[52] U.S. Cl. ........................................ 379/60; 455/33; 379/63
[58] Field of Search ................ 379/59, 60; 455/54, 455/33

[56] References Cited

U.S. PATENT DOCUMENTS

| | | | |
|---|---|---|---|
| 3,764,915 | 10/1973 | Cox et al. | 379/60 |
| 3,819,865 | 6/1974 | Weber et al. | 379/284 |
| 3,819,872 | 6/1974 | Hamrick | 379/60 |
| 3,906,166 | 9/1975 | Cooper et al. | 379/58 |
| 3,916,112 | 10/1975 | Kalat et al. | 379/284 |
| 4,009,347 | 2/1977 | Flemming et al. | 379/104 |
| 4,012,597 | 3/1977 | Lynk, Jr. et al. | 379/58 |
| 4,101,836 | 7/1978 | Craig et al. | 325/302 |
| 4,128,740 | 12/1978 | Graziano | 379/60 |
| 4,144,411 | 3/1979 | Frenkiel | 379/60 |
| 4,144,496 | 3/1979 | Cunningham et al. | 455/33 |
| 4,220,821 | 9/1980 | Lucas | 370/110 |
| 4,247,740 | 1/1981 | Anderson et al. | 379/241 |
| 4,287,567 | 9/1981 | Lumsden | 364/900 |
| 4,307,461 | 12/1981 | Brickman et al. | 370/58 |
| 4,317,229 | 2/1982 | Craig et al. | 455/227 |
| 4,399,555 | 8/1983 | MacDonald et al. | 455/33 |
| 4,442,321 | 4/1984 | Stehman | 379/60 |
| 4,475,010 | 10/1984 | Huensch et al. | 455/33 |
| 4,484,353 | 11/1984 | Flottes et al. | 455/33 |
| 4,485,486 | 11/1984 | Webb et al. | 455/33 |
| 4,530,089 | 7/1985 | Ansell et al. | 370/58 |
| 4,553,262 | 11/1985 | Coe | 455/15 |
| 4,573,206 | 2/1986 | Grauel et al. | 455/15 |
| 4,639,914 | 1/1987 | Winters | 370/110.1 |
| 4,670,899 | 6/1987 | Brody et al. | 379/60 |
| 4,696,027 | 9/1987 | Bonta | 379/60 |

Primary Examiner—Robert Lev
Attorney, Agent, or Firm—Steven G. Parmelee

[57] ABSTRACT

An improved two-way radio communication system having a limited number of channels is disclosed which assigns calls in a max-minimum method, in a first embodiment according to the type of call and sector to be served. This disclosed first embodiment includes a method that ascertains the type of call, handoff or first assignment, and assigns a server with a given central controller to a channel frequency within the requestor sector that minimizes interference to present users. The method of the second embodiment controls requests for assignment to a limited number of channels to reduce adjacent channel interference to and from the requestor with respect to present users operating on a system by utilizing one or more thresholds to arrange channel assignments based upon progressively larger or smaller values of received signal strength.

39 Claims, 13 Drawing Sheets

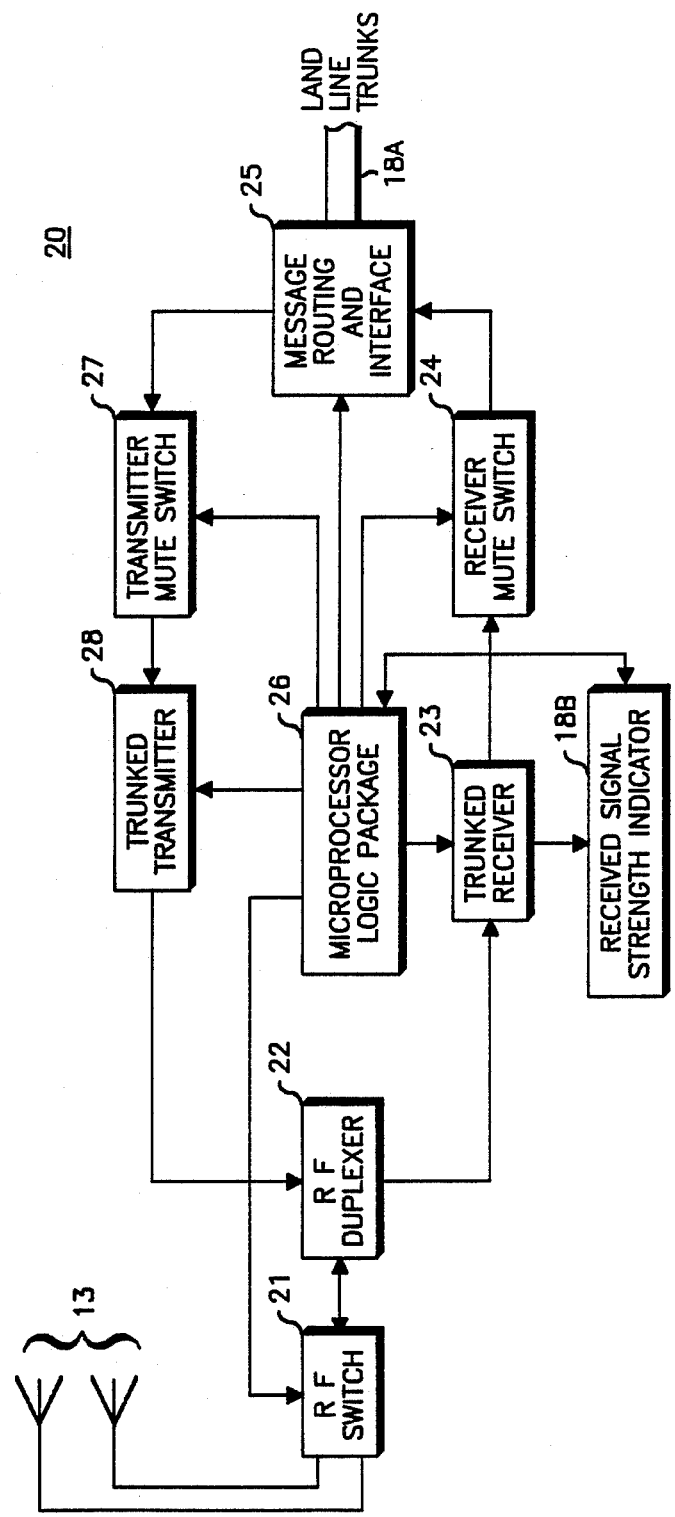

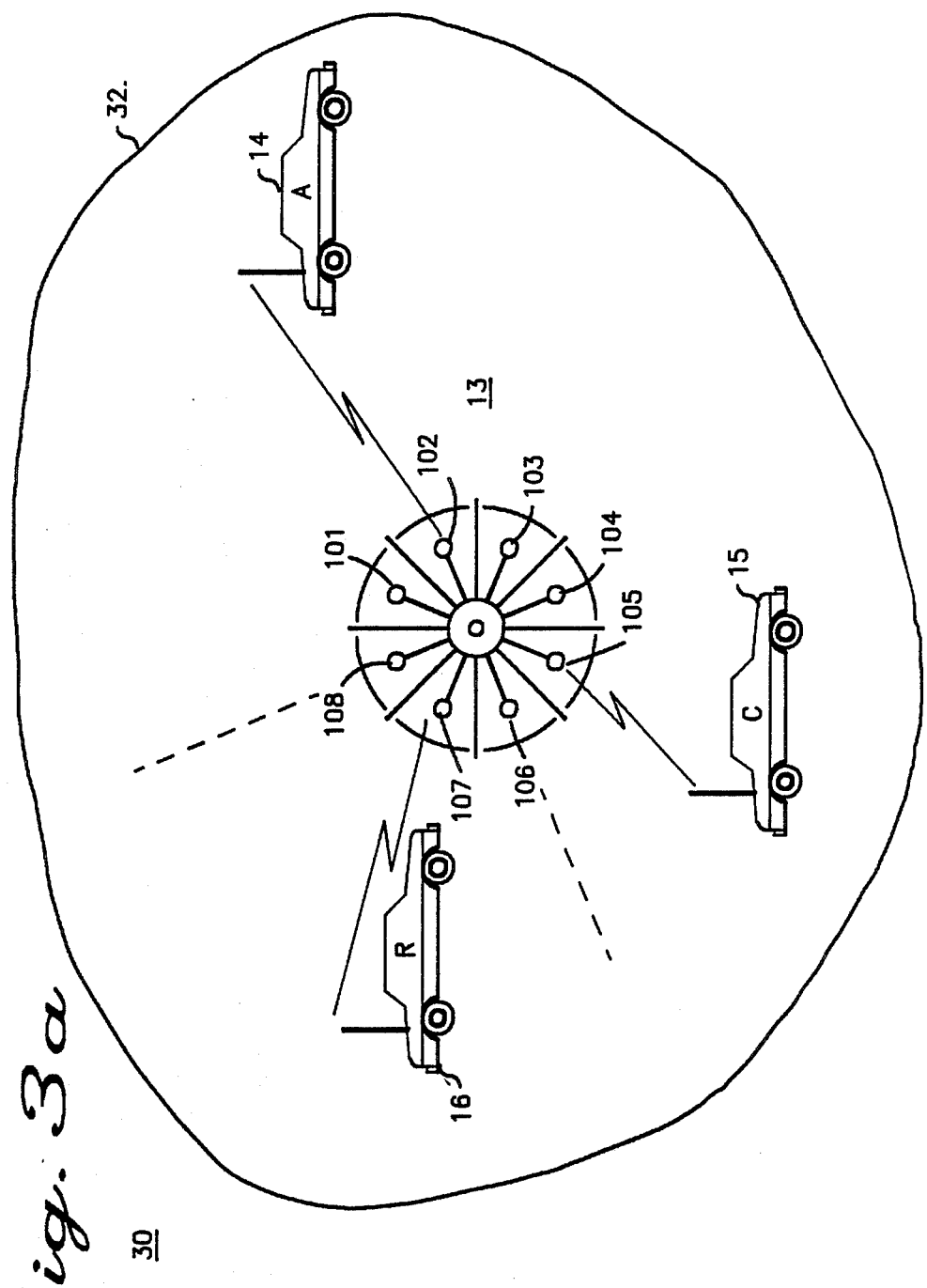

TWO-WAY RADIO COMMUNICATION SYSTEM WITH MAX-MINIMUM CALL ASSIGNMENT METHOD

This application is a continuation-in-part of Ser. No. 06/893,059, now U.S. Pat. No. 4,731,924.

BACKGROUND OF THE INVENTION

This invention relates generally to two-way radio communication systems. More particularly, the invention relates to a system having a single central controller which controls requests for assignment to a limited number of channels to maximize spectral efficiency by channel reuse according to one aspect of the present invention, and which controls requests for assignment to a limited number of channels to reduce adjacent channel interference to and from the requestor by arranging channel assignments according to progressively larger or smaller values of received signal strength according to a second aspect of the present invention.

Trunked communications systems are well known in both the telephone and mobile radio communications art. In such systems, a plurality of subscribers share a limited number of radio transmission channels, or frequencies. These channels are assigned to subscribers such as mobiles or portables by a central controller. The central controller may be implemented as a base control station having central or distributed control logic. The central controller in a trunking system may not only set up and supervise calls, but may discontinue a particular channel assignment by truncating the channel assignment on the conclusion of either the end of a transmission for a transmission trunked signal, or the end of an entire message containing multiple transmissions for message trunked signals. Examples of message trunked signals include interconnect calls, such as a subscriber to land line or land line to subscriber telephone call, or a subscriber accessing a central computer located at the central site or accessible one-on-one via land lines. An example of a transmission trunked communication system is described in U.S. Pat. No. 4,012,597 issued Nov. 24, 1975 to Lynk, Jr. et al., which was assigned to the same assignee as the present invention.

In a trunked communication system, each of the plurality of subscriber radios may be a single as well as a multi-channel unit specially equipped with control circuitry to enable requesting and receiving a channel assignment and to enable operating on the channel assigned by the central controller.

Trunked communication systems provide advantages over well known, conventional, single channel systems, such as those having a dedicate repeater. System congestion problems on a single channel are avoided by the use of a multi-channel system. Additionally, the trunking technique further alleviates congestion problems for a given single channel by allowing other subscribers to utilize the radio channel in between messages or in between transmissions of other subscribers. However, even these forms of trunking systems are limited in the number and variety of calls that may be in progress at any one time. Moreover, message trunked signals, such as interconnect calls, tie up valuable channels for a considerable length of time and at the expense of transmissions trunked signals on the trunking system.

Thus, there exists a need for an improved multi-frequency, trunked, two-way radio communication system in which a plurality of subscribers are provided access and in which two different types of information signals may operate simultaneously without tying up the valuable and limited number of radio frequency channels. Furthermore, in trunked, two-way radio communication systems heavily loaded with a limited number of channels, there exists a need for a way to judiciously assign a requester to a channel to insure that this requester will not experience interference from users on the adjacent two channels and, furthermore, that this requester will not cause interference to those adjacent users.

SUMMARY OF THE INVENTION

Accordingly, it is an object of the present invention to provide an improved multi-frequency, trunked, two-way radio communication system which overcomes the foregoing deficiencies and in which a plurality of subscribers, some of which have one-to-one interconnect call information signals, are provided access.

It is a further object of the present invention to provide a call assignment method for a trunked, two-way radio communication of the foregoing type in which call assignments are handled via a central controller utilizing a single multi-sectored antenna and in which subscriber radios have transmitter power output control.

It is yet another object of the present invention to provide a call assignment method for a trunked, two-way radio communication system of the foregoing type in which splatter caused to and by a requester is kept within acceptable levels by judiciously assigning the requester to a channel based upon an indication of received signal strength at the central control site.

Briefly, in accordance with the present invention, an improved multi-frequency, trunked, two-way radio communication system is provided that selectively operates on any of a predetermined number of information channels to serve a plurality of subscribers so that the system may operate near full load, or capacity, without undue interference.

The invention, therefore, is directed to a call assignment method appropriate for the improved apparatus for effecting more efficient access to and spectral operation of a multi-frequency trunked two-way radio communication system having a limited number of communications channels. In a first aspect of the present invention, the trunked system includes a multi-sectored antenna, a central controller supervising a plurality of trunking repeaters which have a transmitter and receiver therein and which interface to a telephone network via land line trunks. The method permits channel reuse from a single site and includes receiving requests from subscribers, as well as first requests from operators at the end of a land line, requesting a channel assignment in response thereto, receiving and permitting a requestor to operate on an assigned channel so long as the new assignment does not degrade the communications quality of other present subscribers on the system below a certain predetermined threshold, and detecting the conclusion of an information signal interchange via an end of transmission or end of message signal from a subscriber. The method also effects handoff if such a request should occur. In addition to a multi-sectored antenna at the single site and the possible inclusion of an omni antenna in an alternate embodiment, the method contemplates utilizing mobile radios having transmitter output power control. Sufficient apparatus is provided to enable performing the method of the present invention.

In a second aspect of the present invention, the trunked system includes an omni directional antenna and a central controller supervising a plurality of trunking repeaters which have a transmitter and receiver. The method permits a higher level of loading on the multi-frequency trunking system and includes: receiving requests from subscribers desiring a channel assignment, determining the received signal strength for each requesting subscriber or requestor, assigning the requester only to a channel which meets certain splatter protection criteria so that interference caused to and by the requestor is minimized based upon the received signal strength, and then detecting the conclusion of an information signal interchange via an end-of-transmission or end of message signal. Thus, the system and method for assigning channels on a two-way radio communication system according to the present invention overcomes the disadvantages of the known prior art.

These and other objects of the present invention will become apparent to those skilled in the art upon consideration of the accompanying specification, claims, and drawings.

DESCRIPTION OF THE DRAWINGS

FIG. 2 is a block diagram illustrating a repeater operating on one channel of a limited group of channels controlled by a logic package having a microprocessor and serving two or more subscribers via omni directional antenna 13.

FIG. 9a indicates how undesired signal energy components appear on channels adjacent to the desired signal, while FIG. 9b indicates how signal energy components from two present subscribers, designated $U_L$ and $U_H$, can combine on the desired channel to potentially cause interference to the requester if the requester is assigned to this particular channel.

DESCRIPTION OF THE PREFERRED EMBODIMENT

Figure 1:
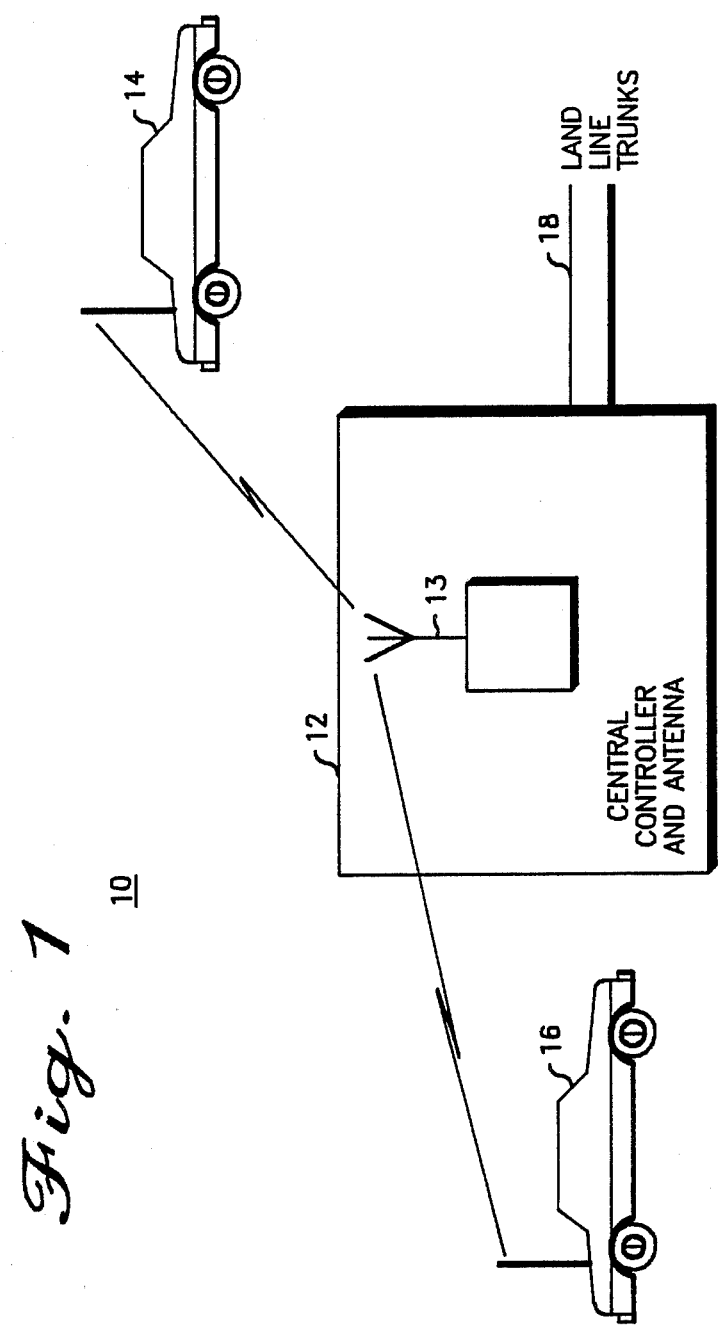
FIG. 1 is a general diagram showing a trunked system serving several subscribers from a central controller containing a group of single channel repeaters and communicating via an omni directional antenna.

Referring now to FIG. 1, there is shown at 10 a general multi-frequency trunked two-way radio communication system which provides service to a plurality of subscribers 14, 16 and which accommodates the methods of the present invention. Central controller 12 consists of a plurality of repeaters and a logic package which handles all assignments of requests for service on the trunking system. Antenna 13 as depicted is an omni antenna. Among the limited number of channels are information channels, or voice channels, and at least one control channel to accommodate signalling between the subscribers or users and the central controller.

Turning now to FIG. 2, there is shown at 20 the equipment necessary to serve one channel using a repeater via either one of two antennas 13, which may be redundant antennas or portions of a multi-sectored antenna to be discussed shortly. As depicted, these two antennas 13 connect to RF switch 21 which serves as an electrically operated single pole double throw switch. This switch connects to RF duplexer 22, which provides a common point of connection for two RF paths within the repeater having a trunked receiver 23, receiver mute switch 24, message routing and interface block 25, under control of central logic package 26, which also controls transmitter mute switch 27 and trunked transmitter 28. In this first embodiment, information signals are routed into or out of antenna 13, to optional land-line trunks 18a via either the receiver path or the transmitter path. Although not shown, multiple repeaters may be utilized. In the second embodiment of the present invention, the repeater equipment depicted at 20 has an optional received signal strength indicator 18b included and the land-line trunks 18a are deleted. Moreover, only one antenna is required.

Figure 3B:
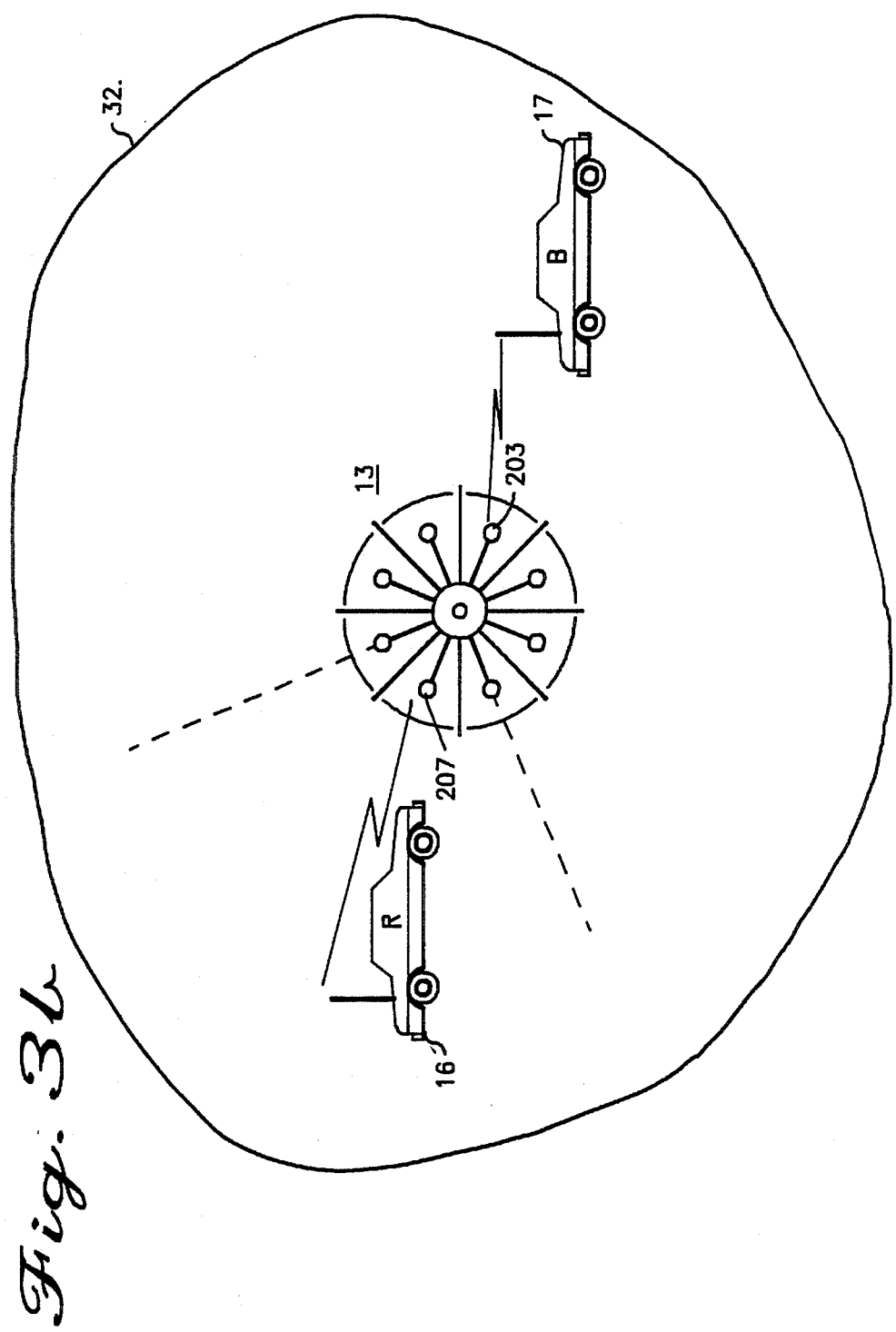
FIGS. 3a, 3b, and 3c are general diagrams showing the service provided to several subscribers in a given coverage area for three different information channels utilizing a multi-sectored antenna, with FIG. 3d illustrating an exemplary embodiment of an antenna having a single multi-sectored antenna and an omni antenna for the given coverage area.
Figure 3C:
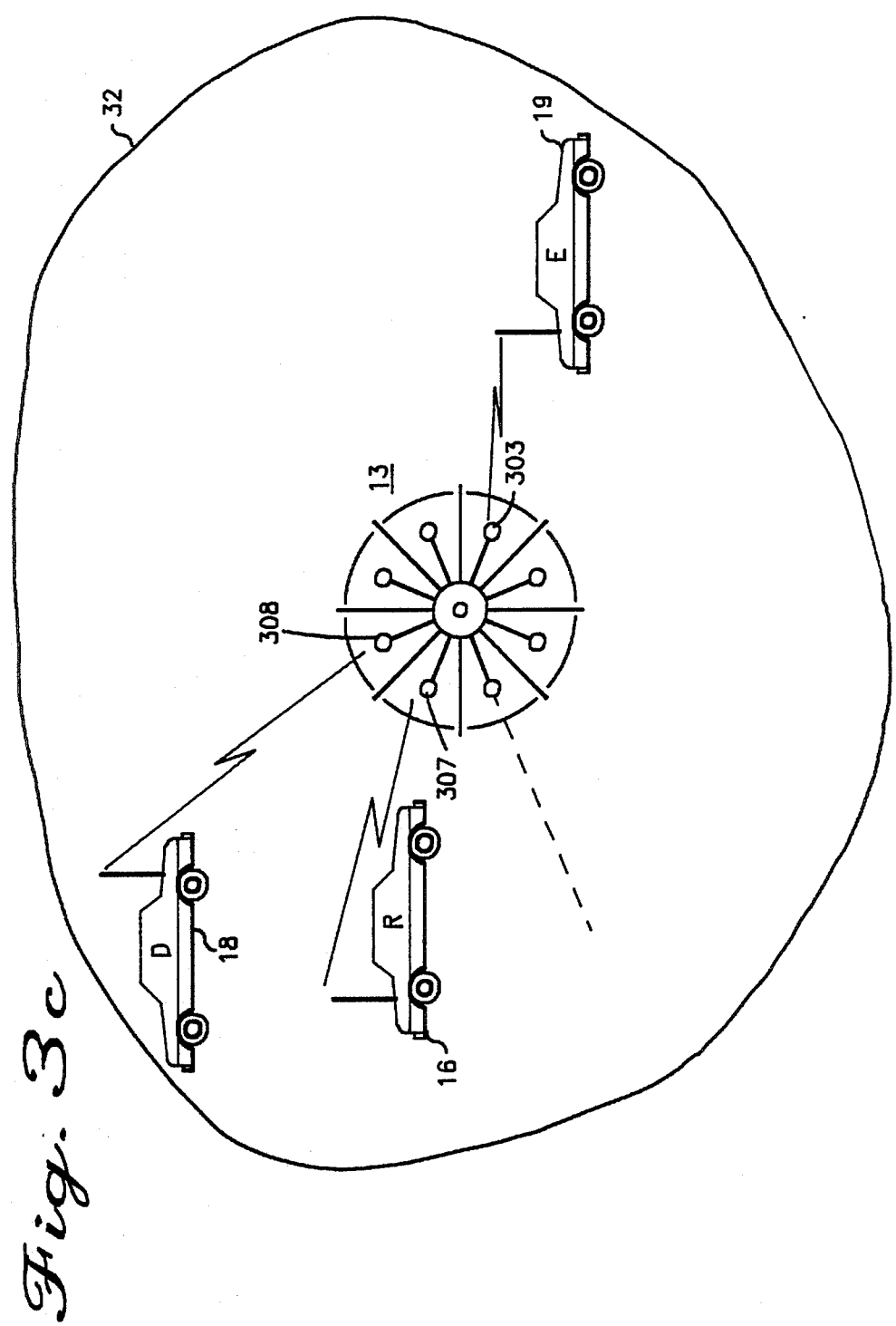

In order to understand how the call assignment method of the first aspect of the present invention operates, an example is given in FIGS. 3a, 3b, and 3c. Turning now to FIG. 3a, a preferred embodiment of antenna 13 is shown serving several subscribers 14, 15, and a requester 16, operative on channel 1 in sectors 102, 105, and possibly 107, all of which are serving a general coverage area 32. In FIG. 3b, a similar usage diagram is shown for channel 2 which is presently serving subscriber 17 and which is also a possible candidate for requester 16. The sectors appropriate for these two subscribers are shown as 203 and 207 covering sectors 3 and 7, respectively, in the general coverage area 32. And finally, in FIG. 3c, several subscribers 18, 19 are shown in addition to requester 16 being served by the trunking system on channel 3 via sectors 303, 308, and possibly 307. A summary of these three channels and their loading of the several repeaters will be shown in FIG. 4 shortly.

Figure 3D:
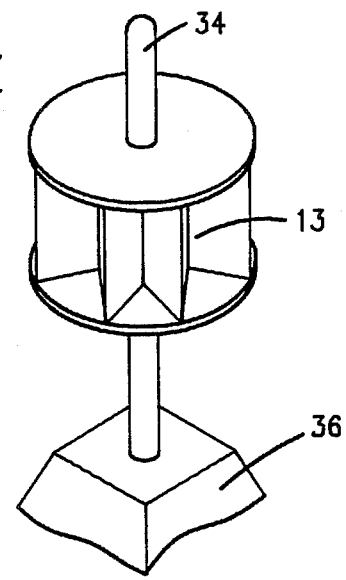

Turning now to FIG. 3d, a general realization for antenna 13 is shown illustrating the multi-sectored feature of this antenna. It may also include an omni antenna 34 which, for simplicity, was not shown in the earlier figures. Such an antenna, while not necessary to implement the present invention, would certainly be beneficial for providing interruption-free service when very near the sectored antenna 13 to help minimize handoff and other interference problems to be discussed later, or for providing control signaling coverage. Since it is contemplated that sectored antenna 13 (as well as an omni antenna 34, if provided) should serve a coverage area having a radius of 25 miles or so, this antenna should be located on an elevated structure 36, such as a tower or a high-rise building.

Figure 4:
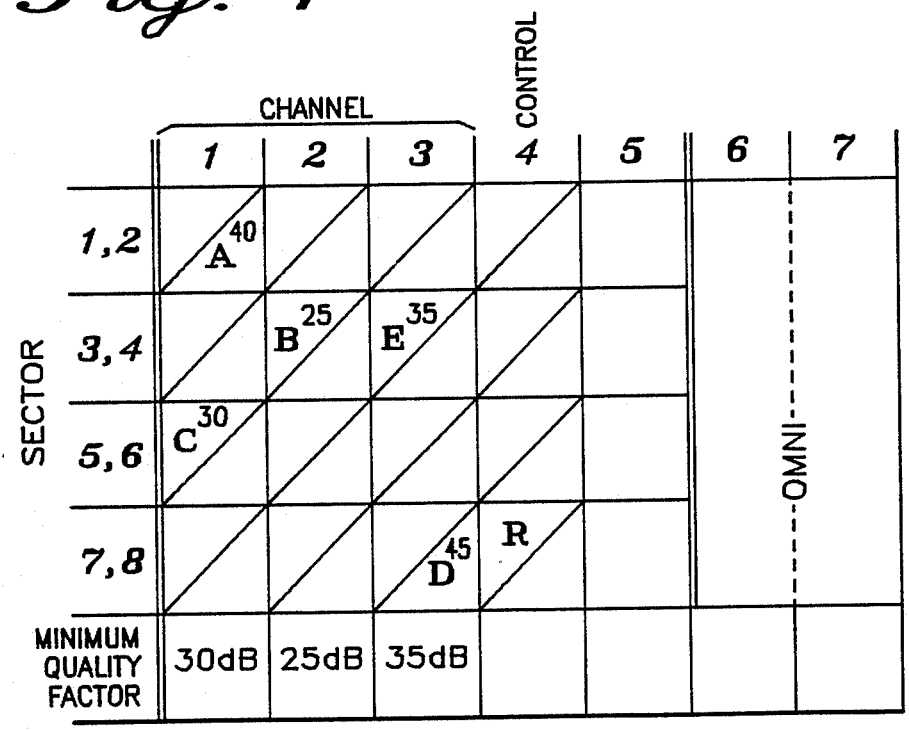
FIG. 4 is a summary table showing repeater usage according to sector and channel corresponding to the general diagrams of FIGS. 3a, 3b and 3c illustrating channel loading.

FIG. 4 depicts a table summarizing usage of repeaters according to channel and sector. Note that for channel 1, subscriber 14 (designated A in the chart) has a communication (Q.F.) quality factor of 40 dB. This 40 dB Q.F. represents the link quality between a subscriber and the central controller as a signal-to-noise plus interference ratio. This Q.F. in the preferred embodiment depends on both inbound and outbound link quality, although just inbound link quality would also work. Data signal monitoring or tone measuring via a SINAD (signal with noise and distortion) method are suitable methods for finding Q.F. Most importantly, both inbound and outbound measurements are preferred in systems exhibiting non-reciprocity transmission characteristics and operating in an environment having multipath distortion effects. Also on channel 1 in sector 5 is shown subscriber 15 ("C"), which has a communication quality factor of 30 dB. This summarizes the present subscriber activity according to FIG. 3a.

Similarly for channel 2, sector 3 presently has subscriber 17, designated by B, which has a communication quality factor of 25 dB. This represents the situation summarized in FIG. 3b. Finally, on channel 3, subscribers 18 and 19, designated by D and E, are shown in sector 8 and sector 3, respectively. Thus, the activity on channel 3 in the chart summarizes the situation in FIG. 3c, and presently shows D having a quality factor of 45 dB, while E has a quality factor of 35 dB. For simplicity of this example, channel 4 represents the control channel, and channels 5, 6 and 7 depicted in FIG. 4 will be reserved for a later discussion. It is important to note that the bottom of FIG. 4 shows the minimum quality factors observed for the present subscribers, as summarized according to channel. Thus, for channel 1, the minimum subscriber quality observed is 30 dB; for channel 2, it is 25 dB; and for channel 3, it is 35 dB.

Given that requestor R has initiated a call assignment request on the control channel 4, the method attempts to assign requestor R to any of the information channels 1, 2, or 3, which is occupied neither in the requestor's sector, here sector 7, nor in the adjacent sectors, 6 or 8. Thus, channel 3 is not eligible as a possibility for sector 7 coverage, because D occupies that channel within sector 8. Next, the method considers channe 2. Although sectors 6, 7, and 8 are unoccupied on channel 2, subscriber B has an observed communication quality factor of only 25 dB. As will soon be evident, this is already too low to allow requestor R to operate on channel 2 within sector 7. Such a preestablished threshold of 25 dB may be set to a different value which depends on the modulation parameters of the system. For 5 KHz deviation systems, a 25 dB signal-to-noise plus interference ratio is a reasonable value. Thus, if the present subscriber threshold is set at 25 dB, there is no reserve to accommodate any amount of degradation to allow R to be served.

Next, considering channel 1 has a minimum communications quality factor of 30 dB for subscriber C within sector 5, this channel represents the best choice, or maximum, among the three channels under consideration for assigning requestor R within sector 7. Here again, sectors 6, 7 and 8 are all unoccupied and there exists a 5 dB reserve above the present subscriber threshold of 25 dB. So, given the choice between eligible channels 1 or 2, the requestor should be assigned to channel 1, sector 7, according to the call assignment method of the first aspect of the present invention.

Figure 5A:
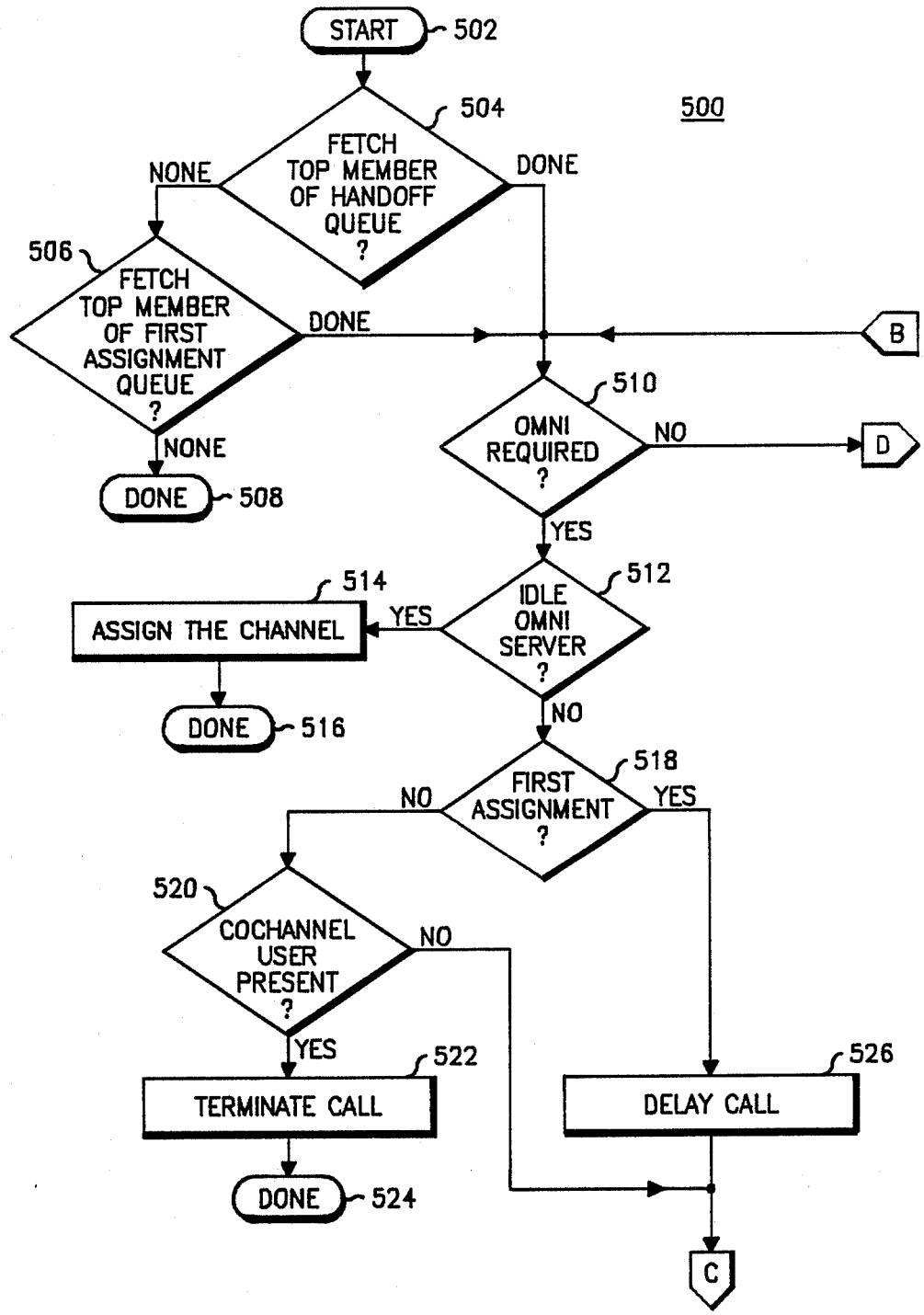
FIGS. 5a, 5b is a logic flow diagram illustrating the general steps of operation for the trunking radio system to determine and supervise channel assignments.
Figure 5B:
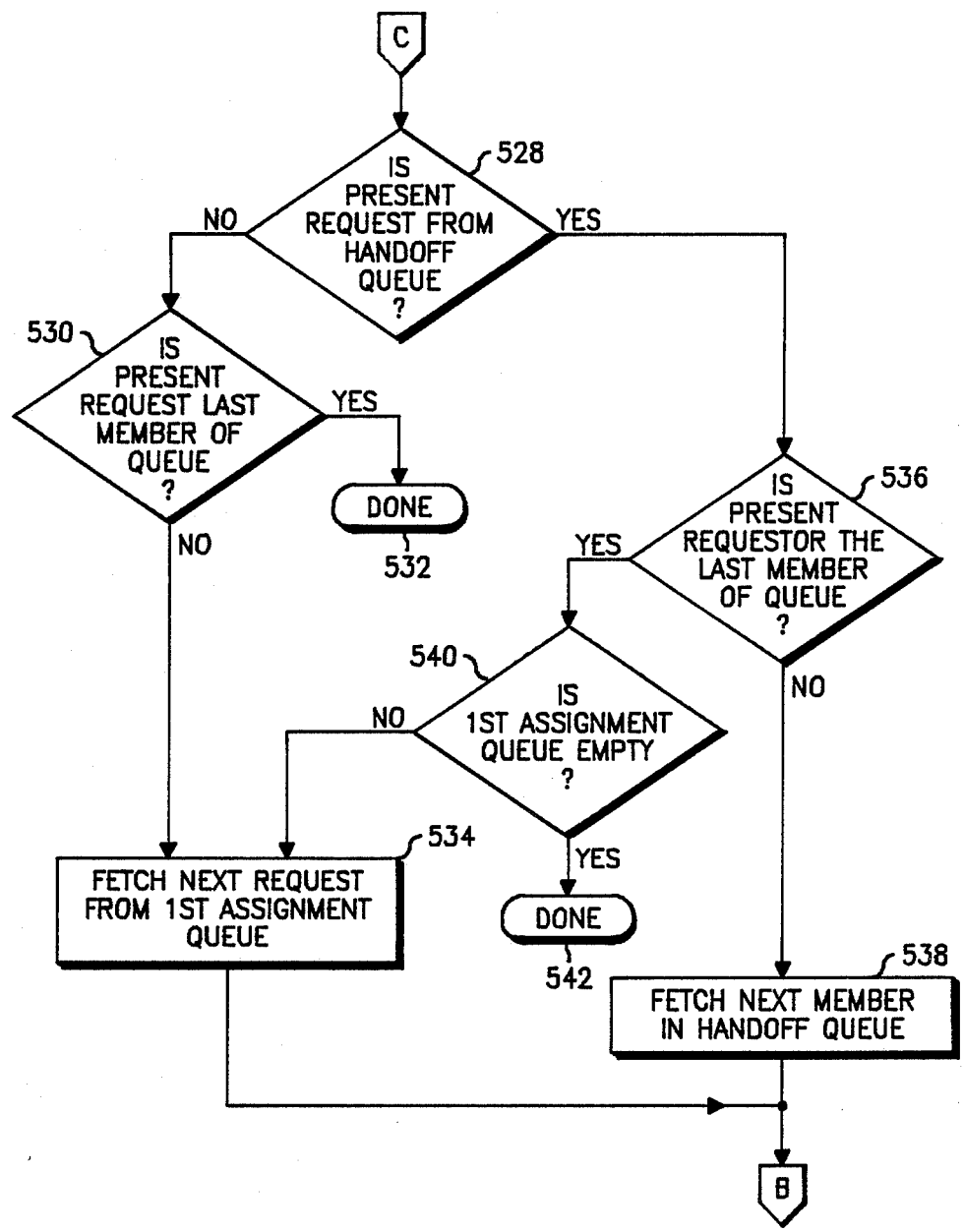

Turning now to FIGS. 5a, 5b, a logic flow diagram representative of this first aspect is shown which relates to the method summarized in FIG. 4 for determining how to best handle a plurality of subscribers and a requestor without degrading the communications quality for the present subscribers on the system. Starting at 502, the method fetches the top member of the handoff queue as represented by condition block 504. If there ar NONE in queue, the method fetches the top member of the first assignment queue, as given at block 506. If there are NONE, then the method has completed its scan task, as represented by block 508. Of course, these two queues could be arranged as one queue with additions made to the top and bottom, respectively, but for clarity these two queues are more easily discussed as two separate entities.

Assuming that there was a top member in the handoff queue, as given by block 504, the method would next test whether or not an omni antenna is required, as given by block 510. Since flow diagram 500 is the preferred embodiment of the first aspect of the present invention, the test for omni antenna usage is shown. An alternate embodiment utilizing no omni antenna is deferred for later discussion. Assuming the answer is YES for using an omni antenna in the preferred embodiment, the method tests to see whether an idle omni server is available, as given by block 512. If the answer is YES, then the method assigns the channel via block 514 before completing the cycle represented by block 516. If the answer to block 512 was NO, then the method checks to see whether this is a first assignment, as denoted by block 518. If the answer is NO, then the next step tests to see whether a co-channel subscriber is present, as given by block 520. If the answer is YES, the method will terminate the call, as given by block 522, before completion of the cycle as represented by block 524. This represents a compromise in the design of the method, in that this was not a first assignment, and the fact that a co-channel subscriber is present means that this call is best handled by an omni antenna, if it is available. If, however, the method detects that this was a first assignment, as checked by block 518, then the method delays the call, represented by block 526, and considers the next member from the handoff queue. This is known as Erlang-C discipline. If the method had detected that NO co-channel subscriber was present, as given at block 520, then the next member in queue is considered.

In considering the next member in queue, the method checks, as represented by block 528, whether the present request is from the handoff queue. If the answer is NO, the method checks to see whether the present request is the last member of the first assignment queue, as given at block 530. If it is, then the method has completed its scan cycle, according to block 532, and is DONE. If, however, the answer is NO to the step given by block 530, then the method fetches the next request from the first assignment queue, as given in block 534. From this point, the method proceeds back to the step of checking whether an omni antenna is required, as shown at block 510. Going back to the step of checking whether the present request is from the handoff queue, as represented in block 528, if the answer is YES, the method next checks whether the present requestor is the last member of the handoff queue, ss given at block 536. If it is not, the method fetches, via block 538, the next member in the handoff queue. Then the method continues by proceeding back to the checkpoint represented by block 510. If the present requestor is the last member of the handoff queue, as verified in block 536, then the method determines whether the first assignment queue is empty, as depicted at block 540. If it is, then the method has completed its cycle, as shown at block 542. If the first assignment queue is not empty, as checked by representative block 540, the method proceeds to fetch the next request from the first assignment queue, as given by block 534. Thus, the above method makes every effort to handle calls in queue to maintain the system in a fully loaded state. This method does so by reusing as many of the information channels in alternate sectors as the array of present subscribers and new requests will allow.

Figure 6:
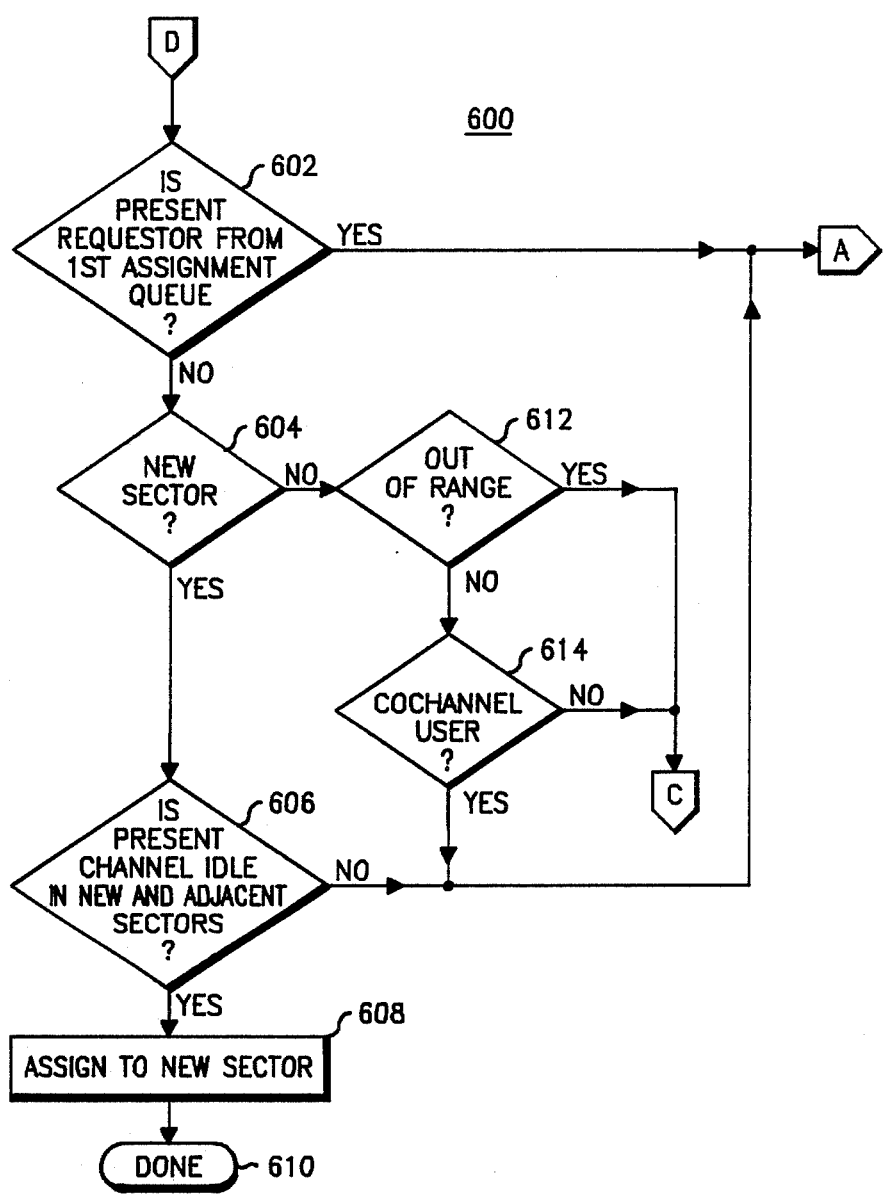
FIG. 6 is a logic flow diagram continuation from FIG. 5a, 5b which specifically illustrates handoff assignments for the multi-sectored trunking system.

Turning now to FIG. 6, there is shown at 600 the steps of the method specifically addressing handoff requests. Once the method determines that an omni antenna is not required, as checked by block 510, the method checks to see whether the present requestor is from the first assignment queue, as given by block 602. If the requestor is not, thus indicating a handoff call, the method checks, via block 604, whether the request is in a new sector. If a new sector is involved, the method checks to see, via block 606, whether the present channel is idle in the new and (new) adjacent sectors to which the subscriber has entered. If the answer is YES, the method assigns the subscriber to a new sector on the present channel, via block 608, before completing this cycle, as represented by step 610. If NO new sector is involved, the method checks to see whether the subscriber is out of range, as represented by block 612. If the requestor is still in range, the method checks to see whether there is a co-channel subscriber according to block 614. If the requestor is out of range, or if there is a co-channel user, the method proceeds to consider the next request in queue, as previously given at block 528. If the present request is from the first assignment queue, or the there is a co-channel user, or the present channel is active in the new and new adjacent sectors, then the method proceeds to the max-minimum procedure depicted in the next figure.

Figure 7:
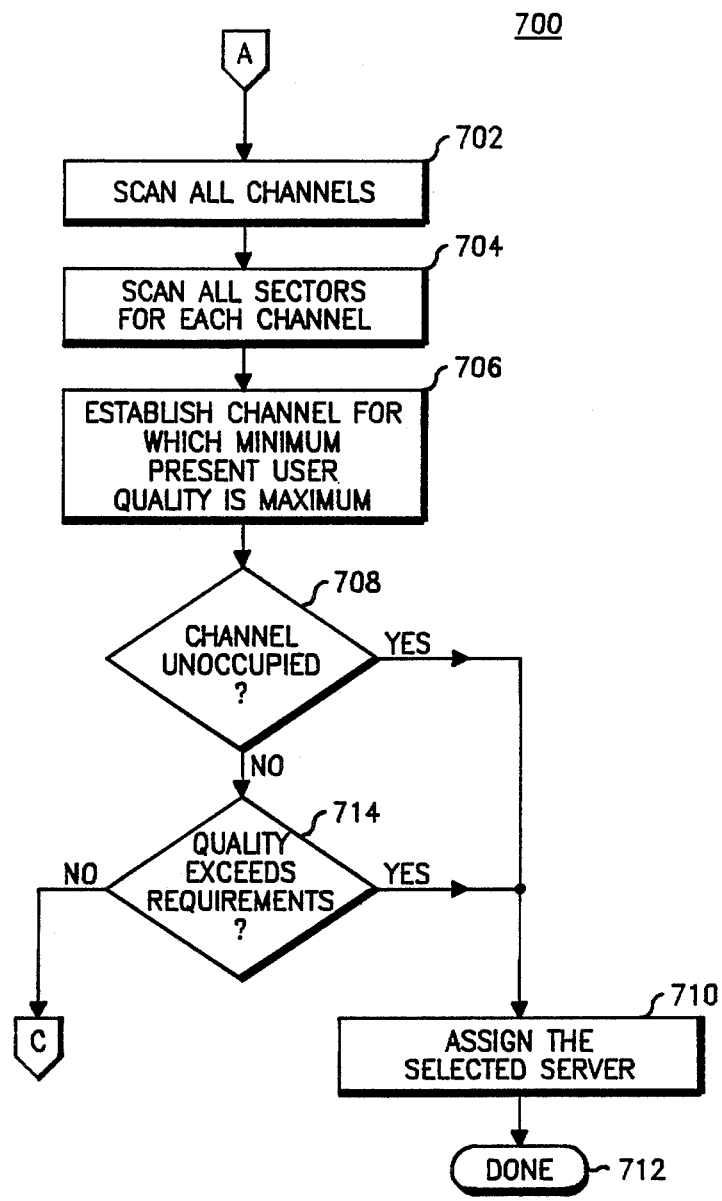
FIG. 7 is a logic flow diagram illustrating the first aspect of the max-minimum call assignment method which permits the requester's channel assignment to be determined by minimizing the degradation to existing traffic currently in progress.

In FIG. 7, depicted at 700, is a representation of the final crucial steps for assigning a given channel request according to the first aspect of the max-minimum call assignment method of the present invention. The method begins by scanning all the channels, according to step 702. It skips the present channel, if a handoff call, and also any channels for which the requestor sector, or the adjacent two sectors, are active. The method next scans all sectors for each channel, as given by block 704. In so doing, it skips any sector if the sector is inactive or if the requestor is beyond power control range. Since this flow diagram represents the preferred embodiment of first aspect of the present invention, both steps 702 and 704 include checking the inbound and outbound communications quality on each channel and sector, and the control channel as well. However, the present invention could be simplified in an alternate embodiment such that the scanning steps represented at 702 and 704 merely check the inbound or received communications quality for each channel and sector thereon. Such a simplified sectored antenna receiving system and method has been disclosed in U.S. Pat. No. 4,317,229 to Craig et al., which is assigned to the assignee of the present invention. It is important to note however that the scanning method is merely one part of the max-minimum call assignment method herein disclosed, and there are certainly many ways in which the scanning portion of the procedure of the present invention may be implemented.

The method next establishes the channel for which the minimum present subscriber quality factor is maximum, as given by step 706. This step corresponds to the summary of the comparison shown at the bottom of FIG. 4 in which, in that example, it was determined that channel 1 in sector 7 was preferable to assigning the requestor as compared to channel 2 sector 7. Next, the method checks, via block 708, whether the channel is unoccupied. If the channel is unoccupied, then it assigns the selected server, or repeater, for this request, as shown at block 710. The method has then completed its cycle, according to block 712.

If, however, tee channel was occupied, the method checks whether the quality of this channel assignment exceeds the required threshold value, as shown at block 714. If this requirement is met, then the requestor is assigned the selected server, as represented at block 710. This quality requirement is preestablished according to system needs so that the requestor's quality must exceed a threshold value, such as 30 dB. If, however, the quality does not exceed the threshold value established for the system, then the method proceeds to consider the next call in queue, as shown at block 528.

In an alternate embodiment, the flow diagrams of FIGS. 5a, 5b, 6, and 7 would be essentilly the same, except for some modifications to FIG. 5a. These changes would mainly involve deletion of steps 510 through 526, which pertain to an omni antenna being co-located as part of antenna 13. Depending on the operating requirements of the system, an omni antenna might not be needed. This antenna was included in the preferred embodiment to be duplexed onto two separate repeaters tuned to channels 6 and 7, as previously depicted in FIG. 4. In this way, one of the two channels, 6 or 7, would be dedicated to another control channel, while the other would be an information channel. Such an arrangement would permit coverage for a subscriber that happened to be too close to the center of the coverage area and therefore very near the multi-sectored antenna. Such an arrangement would minimize handoff problems related to the subscriber's movement with respect to the multi-sectored antenna. However, in systems where it is foreseen that subscribers would never encroach the very center of the coverage area, the omni antenna and its two related channels, 6 and 7, could be eliminated. And, assuming the system utilized a multi-sectored antenna having eight sectors, the addition of another channel, channel 5, would be justified for allowing up to four simultaneous calls on alternate sectors for each of 4 channels.

Therefore, unlike conventional trunking systems and methods, the first aspect of the present invention seeks to efficiently load the system according to channel and sector by considering all of the candidates in queue, giving priority to those in handoff queue ahead of those in the first assignment queue. Moreover, this first aspect of the present invention does not handle each and every request in a first-in and first-out fashion. This system and method permits a sifting through of the requests in queue to efficiently load the exemplary sectorized trunking system depicted herein while minimizing interference to calls presently in progress. Of course, this method is also applicable to a simplified trunking system in which only a single omni antenna is utilized for covering a geographical area which has only a few subscribers. Thus, the first aspect of the present invention overcomes the limitations of the known art.

Figure 8:
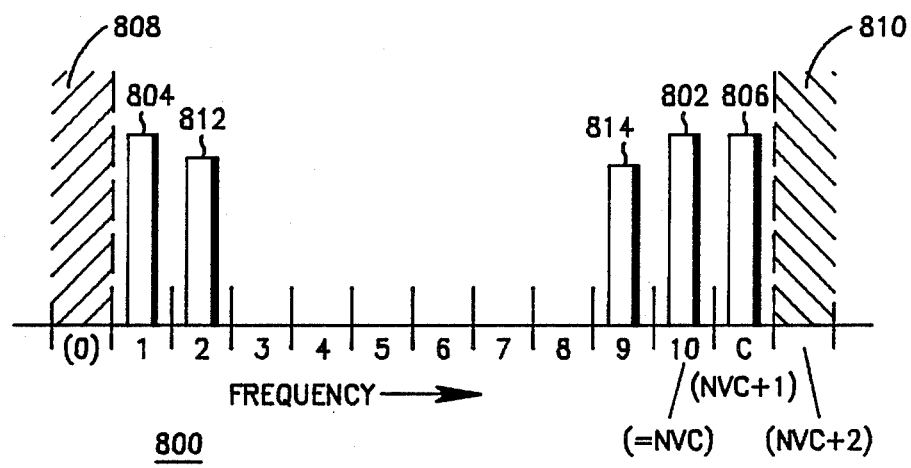
FIG. 8 is a spectral diagram indicative of a second aspect of the max-minimum call assignment method which arranges the users according to received signal strength, with the strongest received signal strength users located near the outer band-edges, and the weaker received signal strength users located near the center of the band. In this example, the control channel is shown at the high end of the band.

Turning now to FIG. 8, there is shown at 800 a frequency spectral diagram representative of a second aspect of a trunking system depicted in FIG. 2, having a received signal strength indicator 18b in place of the land-line trunks 18a that were utilized in the first aspect of the present invention. As shown in the exemplary embodiment at 800 in FIG. 8, there are ten voice channels (denoted NVC), with the highest frequency voice channel designated 802. The first channel 804 is depicted at the low end of the frequency band, with a control channel (here labelled NVC+1) at 806. The first out-of-band channel 808, here designated channel 0, is shown, as well as the first out-of-band channel 810 at the high end of the band (here labelled NVC+2). The method of assigning channels according to the second aspect of the present invention arranges those users having the relatively highest received signal strength values at the base site receiver to assigned channels along the outer-most edges of the frequency band, and here depicted as channels 802 and 804. Next, those subscribers of intermediate received signal strength levels are assigned to channels 812 and 814, here such as channels 2 and 9. Those subscribers having the weakest received signal strength are then assigned the innermost, protected channels, such as channels 5 and 6. Although channels 3-8 do not presently show subscribers operating, there could be subscribers operating on these channels with some finite amount of received signal strength, but at this instant in time, the spectral diagram does not depict any such users.

Figure 9A:
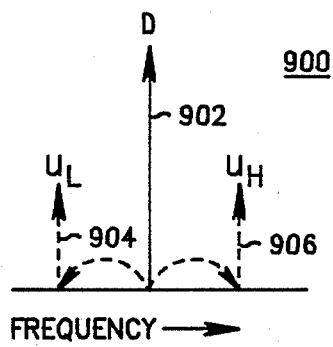
FIGS. 9a and 9b are simplified spectral diagrams illustrating the bi-directional nature of interference when attempting to assign a requester to a given channel from those depicted in FIG. 8.
Figure 9B:
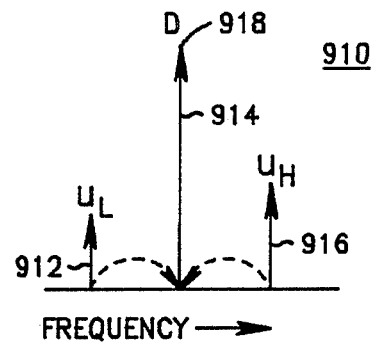

Turning now to FIG. 9a, a simplified spectral diagram is shown at 900 which depicts a given subscriber's desired on-channel signal as an RF carrier 902. While so operating, the on-channel desired signal 902 produces an undesired amount of interference on both a lower adjacent channel 904 and a higher, or upper, adjacent channel 906. As given at 910 in FIG. 9b, a present user operating on the lower adjacent channel 912 will cause a component of signal power to occur on the desired channel which, simultaneously, will also contain a component generated by a high side adjacent channel user, designated 916. These undesired amounts of on-channel signal power will equate to level 918 at any particular moment in time. As will be seen, the method according to the second aspect of the present invention will first consider the signal relationships depicted in FIG. 9a, so that the requester is assigned to a channel which insures that his adjacent channel components will not exceed a fixed threshold value, and then will consider the signal relationships according to FIG. 9b, so as to maximize the amount of protection afforded this requester from present users operating on adjacent channels by assigning him to the best possible assignment frequency. In this way, the method utilizes a signal strength window to determine a channel assignment for the requestor by choosing the channel which best minimizes the greater of the undesired-to-desired ratios.

Figure 10A:
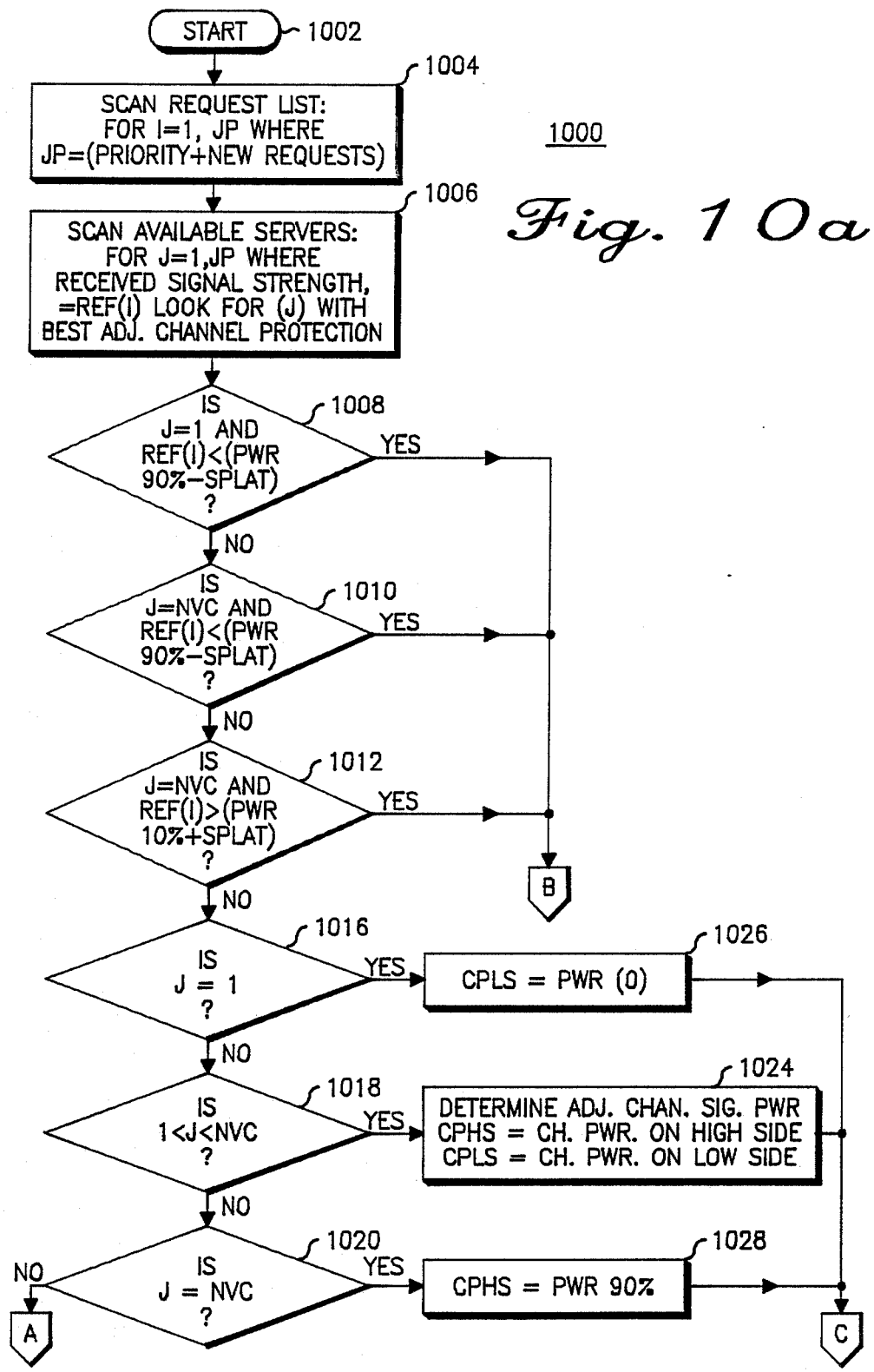
FIGS. 10a–10b are a logic flow diagram illustrating the general steps of operation for the trunked radio system to determine and supervise channel assignments in which the interference mechanisms of FIGS. 9a and 9b are considered in accordance with the second aspect of the present invention.
Figure 10B:
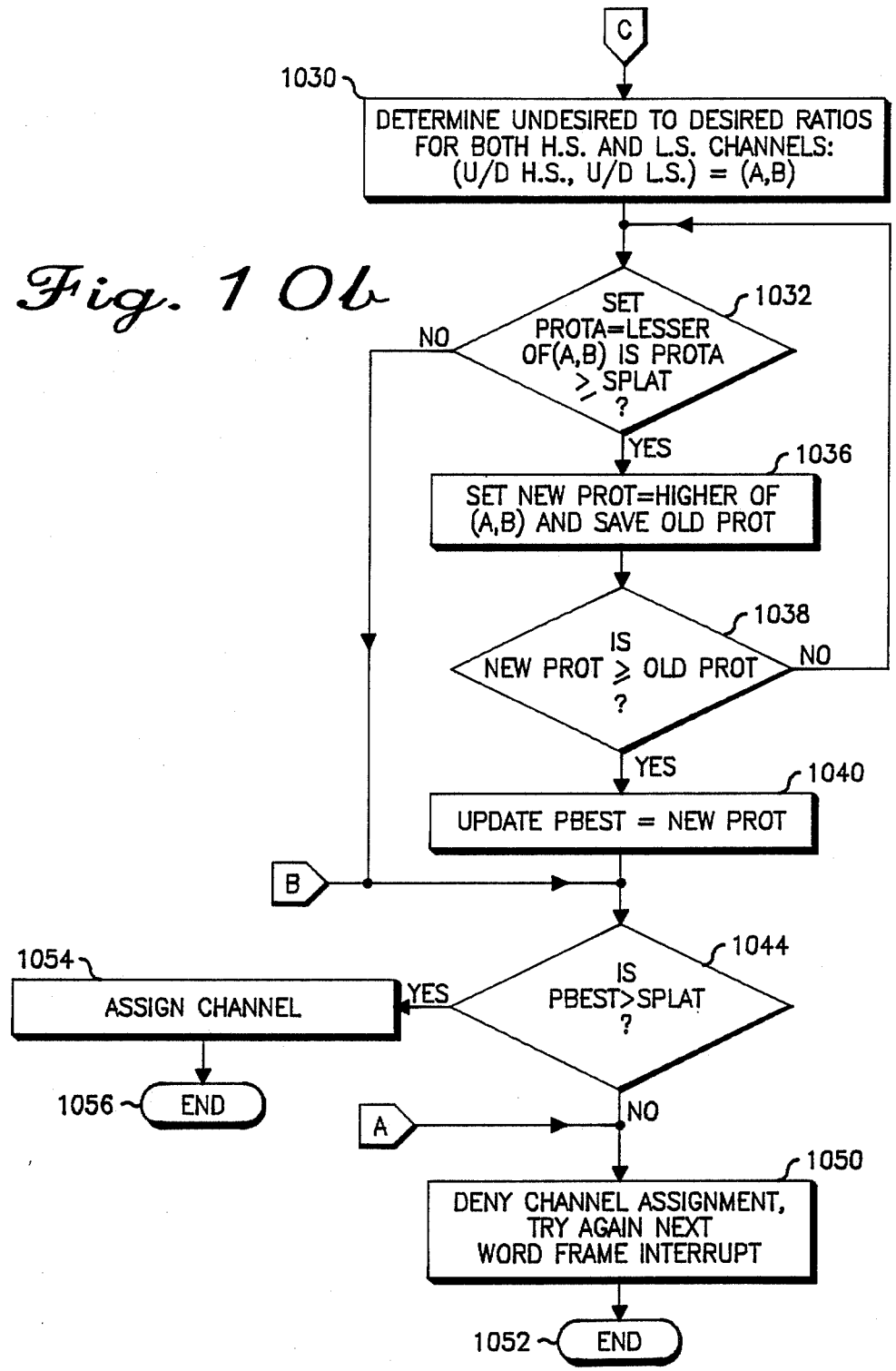

Turning now to FIG. 10, a flow chart is depicted at 1000 which represents the steps of the exemplary method for assigning channels to subscribers according to the relative level of signal strength as received at a given subscriber's mobile radio. Starting at block 1002, the method scans the request list, which includes both priority as well as new assignment requests, as represented at block 1004. Next, it scans the available servers, or repeaters, available in the base station, via block 1006, for each received signal strength level defined as REF(I), and looks for the best adjacent channel protection for each of the available servers, J.

The method then proceeds to check for immediate rejection of a channel assignment, via block 1008, due to several special circumstances. The first criteria checked, as given in block 1008, is whether the channel number equals 1 (J=1) and if the received signal strength (denoted REF(I)) is insufficiently high to protect against the X percentile level of signal strength representative of channel 0. Channel 0 belongs to some other system uncontrolled by the present method. In this exemplary embodiment, the 90 percentile level was used (X=90) and the amount of splatter protection required to permit a channel assignment was specified as SPLAT, expressed in dB. This splatter protection is dependent upon the characteristics of the mobile radios, and is able to be selected according to the protection needs of the system in which they are to be used.

For example, while a 12.5 kHz channel spacing narrowband FM system can offer a nominal splatter performance of 60 dB, the splatter performance drops to 44 dB when the reference oscillator error in the mobile radio is just $+/-2$PPM (parts per million). Thus, systems having narrower channel spacings require better adjacent channel protection, achieved either by near-ideal frequency stability in the mobile radios, or by more efficient assignment of the users to limit the adjacent occurrence of users with vastly different signal strengths.

Given that the criteria listed in block 1008 is not met, the method proceeds to check, via block 1010, whether the channel number is equal to the highest voice channel, namely, NVC, and whether the received signal strength REF(I) is sufficiently high to protect against the X percentile signal strength of channel NVC+1, here considered to be the signalling channel, or control channel. Assuming the answer is No, the method also checks, via block 1012, whether, for the same channel, the received signal strength is so high that it would harm control signals less than the Y percentile in signal strength. Here the 10 percentile was used (Y=10).

If the criteria represented by any of blocks 1008, 1010, or 1012 is met, the method proceeds to the final steps, as represented at block 1044. If the criteria is not met up to block 1016, the method determines adjacent channel signal power values in a series of steps, beginning with block 1016. The method first checks whether channel 1 is under consideration. If it is not, the method next checks, via block 1018, whether the channel under consideration for assignment is between channel 1 and the highest voice channel, NVC. If the channel is not, the method considers whether the channel assignment is equal to the highest voice channel, as given at block 1020. If it is not the highest voice channel, the method denies the channel assignment, as given by block 1050.

However, assuming a normal situation is encountered, the method will determine that the channel is between the lowest and highest channels, via block 1018, and will determine the adjacent channel signal power, as represented in block 1024. The method determines the adjacent channel signal power on the high side, labelled CPHS, and the channel power on the low side, labelled CPLS. If channel 1 is the one under consideration, as represented in block 1016, the method computes the signal power, via block 1026, on the low side equal to the channel power when the receiver is tuned to out-of-band channel 0, as shown. If the channel is the highest voice channel, NVC, as given at block 1020, the method computes the carrier power on the high side as equal to the 90 percentile signal strength, as depicted in block 1028.

The method determines the undesired-to-desired ratios for both the high side and low side channels, as given at block 1030. The ratios are, respectively, A = the undesired-to-desired ratio on the high side and B = the undesired-to-desired ratio for the low side. Next, the method sets the protection afforded, PROTA, equal to the lesser of A or B, as represented at block 1032, and then checks to see if the protection afforded is greater than the splatter requirement. If it is not, the method proceeds to block 1044, as shown. If the answer is Yes, the method next sets the new value of protection equal to the least protection afforded the user being considered for assignment or, in other words, the highest interference-to-desired ratio, or power difference expressed in dB, of the high side, A, and the low side, B, values, per, block 1036, and saves the old value of protection.

Next, in block 1038, the method checks to see if the new value of protection is greater than or equal to the old value of protection. If the answer is No, the method loops back to begin the process at block 1032 as shown. If the new protection exceeds the old value, then the method updates, via block 1040, the best value of protection seen thus far by setting PBEST equal to the new value of protection, as shown.

Next, the method checks, at block 1044, whether the best value of protection is greater than the splatter requirement. If the criteria is not met for this channel, the method denies the channel assignment, instructing the controller to try again next word frame interrupt, as depicted at block 1050. Having done so, the method ends, as shown in block 1052. However, if the criteria is met in block 1044, the method permits the channel assignment. The method then ends, as shown in block 1056.

Experimental results of system performance for various types of trunked systems having 5, 10, and 20 channels and having splatter protection equal to infinity, 50 dB, and 40 dB, respectively, are summarized below in table 1.

TABLE I

| | TRUNKED SYSTEM CAPACITY | | | | |
|---|---|---|---|---|---|
| | | Splatter number = Infinite | | | |
| | | 50 dB | | 40 dB | |
| | IDEAL SYS. | SYS. #1 | SYS. #2 | SYS. #1 | SYS. #2 |
| 5 channels | 2.65 Erlangs | 2.37 | 2.52 | 1.35 | 2.43 |
| 10 channels | 7.52 | 7.25 | 7.40 | 6.70 | 7.25 |
| 20 channels | 18.0 | 17.7 | — | 17.2 | — |
| 5 channels | 577 Users | 513 | 548 | 275 | 526 |
| 10 channels | 1765 | 1710 | 1736 | 1490 | 1700 |
| 20 channels | 4400 | 4325 | — | 4175 | — |

This table assumes four seconds average message delay, and indicates channel loading in terms of Erlangs, as well as the number of subscriber units supportable on such systems. It is easy to see that the method according to the second aspect of the present invention allows almost full capacity to be utilized on systems of 10 channels or more, even with splatter numbers as low as 40 dB and with widely varying signal strength distributions, such as were measured on systmm 1. System operation with 5 channels appears feasible, provided at least 50 dB splatter protection can be achieved in the mobile radios. Moreover, if the signal strength distribution is less severe, as is found on a system having a relatively high base station antenna, such as system 2, then five channel operation with just 40 dB splatter protection results in little loss of capacity. Thus, this method overcomes the limitation of the known art and is suitable for use in a system using just this technique, as in shared mobile radio (SMR) channels or perhaps in conjunction with the first aspect of the present invention to further optimize assignment of channels.

Although the methods of the present invention fully disclose many of the attendant advantages, it is understood that various changes and modifications not depicted herein are apparent to those skilled in the art. Therefore, even though the form of the above-described invention is merely a preferred or exemplary embodiment given with practical alternates as discussed, further variations may be made in the form, construction, and arrangement of the parts without departing from the scope of the above invention.

I claim:

1. A method for assigning a channel to a requestor in addition to serving a plurality of present subscribers operating on a trunking radio system having a limited number of channels and a single but centrally-located site and a multisectored antenna, the method comprising the steps of:
    (a) determining the channel and sector activity for said subscribers and establishing a minimum quality factor thereof for each active channel as a first step to establish an eligible channel to which the requestor will be assigned;
    (b) comparing the minimum quality factors attributable to such present subscribers for each channel with respect to every other channel as a second step; and
    (c) assigning the requestor to a particular one of the possible eligible channels which has a maximum of subscribers having at least the minimum quality factor determined in step (b) above, provided such maximum is above a given threshold value, so as to enhance system capacity through channel re-use while minimizing interference to existing traffic thereon.

2. The method according to claim 1, wherein step (a) includes measuring the inbound link quality.

3. The method according to claim 1, wherein step (a) includes measuring the inbound and outbound link quality.

4. The method according to claim 1, wherein step (a) includes a multi-sectored antenna for noting which channels are presently in use and determining a set of eligible channels by noting which channels are presently idle.

5. The method according to claim 1, wherein step (a) includes measuring the carrier to interference ratio thereon.

6. The method according to claim 5, wherein said step of measuring the carrier to interference ratio includes utilizing low speed data.

7. The method according to claim 1, wherein step (a) includes measuring a tone using a method such as the SINAD method.

8. The method according to claim 1, wherein step (b) includes sequentially comparing the lowest quality factor for present subscribers on one channel to the lowest quality factor for present subscribers on another channel and storing the particular channel for which the lowest quality factor is maximum among these present subscribers.

9. The method according to claim 1, wherein step (b) includes comparing the quality factors of present subscribers to a preestablished threshold set according to the modulation parameters.

10. The method according to claim 9, wherein said preestablished threshold is approximately 25 dB.

11. The method according to claim 1, wherein step (c) includes first assignments.

12. The method according to claim 4, wherein step (c) includes first assignments and handoff assignments.

13. The method according to claim 1, wherein said satisfactory quality factor is at least 30 dB.

14. The method according to claim 1, wherein step (c) includes considering another request in queue if said previous request could not be assigned.

15. The method according to claim 14, wherein calls are queued according to Erlang-C discipline.

16. Control apparatus for a trunking communication system having a single centrally located control station for providing service via a limited number of channels to a plurality of subscribers, the apparatus comprising:
  subscriber stations having:
  (a) means for requesting a channel assignment from the central control station;
  (b) means responsive to an assigned channel signal to operate on said channel with variable power output and measure inbound and outbound link quality;
  (c) means for generating an end of information interchange signal at the conclusion thereof; and
  the central control station having:
  (a) means for determining a present channel, including means for identifying subscribers and means for establishing a minimum quality factor on each channel so as to establish at least one eligible channel for a requesting subscriber;
  (b) means for supervising channel activity comprising:
  means for comparing the present minimum quality factor for each channel with respect to other channels so as to establish eligible channels;
  means for assigning a requesting subscriber to any of said eligible channels which is above a given threshold value;
  means for controlling the power output of said subscribers; and
  (c) means for detecting an end of transmission or end of message signal from any subscriber and truncating the channel assignment in response thereto.

17. The control apparatus according to claim 16, wherein means for requesting a channel assignment includes transmitting a data word such as an unique subscriber identification signal in conjunction with the channel assignment request via a control channel.

18. The control apparatus according to claim 16, wherein means responsive to an assigned channel signal includes a transceiver changing operation from a given present channel to a newly assigned channel.

19. The control apparatus according to claim 16, wherein means for determining a present channel includes a memory device coupled to a receive signal strength indicator for noting which channels are presently in use and determining eligible channels by noting which channels are presently idle.

20. The control apparatus according to claim 16, wherein central control station channel supervising means comprises means such as a microprocessor, to predeterminedly prioritize subscribers' requests into a handoff queue having relatively high priority and a first assignment queue having relatively low priority, and means for considering channel requests in the relative order of priority.

21. The control apparatus according to claim 16, wherein the central control station includes a channel supervising means comprising means for determining a present channel by use of a multi-sectored antenna and an omni antenna, and means for determining when to switch to an omni coverage antenna for serving a given subscriber upon determining that said given subscriber is too close.

22. The apparatus according to claim 16, wherein said central control station includes means for indicating received signal strength within said means for determining a present channel.

23. The apparatus according to claim 16, wherein said means for comparing the present minimum quality factor includes a first comparator with a fixed threshold limit for ensuring that the requestor will not interfere with existing calls and a second comparator for ensuring that a channel is assigned which will provide the maximum amount of protection against adjacent channel interference above a predefined level.

24. In a communications trunking system having a single central controller and a plurality of identifiable subscriber radios, the central controller routing interchanged traffic between subscriber radios over a limited number of identify information channels, and control occuring on a control channel, each identifiable subscriber radio comprising:
  controllably tuned transceiver means for communication via a control channel or an assigned information channel to the central controller;
  control means within said subscriber radio for requesting a channel assignment, for providing a measure of part of an outbound link quality as communications link quality between the central controller and said radio, and responsive to an assigned channel signal from the central controller to operate on a given channel; and transceiver power output controlling means, coupled to said transceiver, for receiving a power output control signal from the central controller for changing power output on the asigned channel and response thereto.

25. The subscriber radio according to claim 24, wherein said transceiver means comprises a transmitter and receiver operative in a simplex mode.

26. The subscriber radio according to claim 24, wherein said transceiver means comprises a transmitter and receiver operative in a duplex mode.

27. The subscriber radio according to claim 24, wherein said control means within said subscriber radio comprises a logic unit having a microprocessor.

28. The subscriber radio according to claim 24, wherein said control means includes identification means, coupled to the transceiver means, for generating and sending a predetermined identification signal in conjunction with a request signal.

29. The subscriber radio according to claim 21, wherein control means includes end of transmission signaling means for notifying the central controller that said interchange traffic has concluded.

30. The subscriber radio according to claim 24, wherein said interchange traffic includes message trunked traffic and transmission trunked traffic thereon.

31. The subscriber radio according to claim 24, wherein said control means monitors inbound communications link quality on said control channel as well as on an assigned information channel.

32. The subscriber radio according to claim 30, wherein said link quality is monitored by means of a data signal, such as a low speed data stream on said assigned information channel.

33. The subscriber radio according to claim 24, wherein said transceiver power output controlling means is operative only on an assigned information channel.

34. The subscriber ratio according to claim 24, wherein said control means includes mode switch means controllable by the subscriber as well as by said central controller.

35. The subscriber radio according to claim 34, wherein said mode switch means includes an electronic switch for choosing between a transmission trunked and a message trunked mode of communicating said interchange traffic.

36. A method for assigning a channel to a requestor in addition to serving a plurality of present subscribers operating on a radio system having a limited number of channels, the method comprising the steps of:
(a) monitoring at least some of the channels;
(b) identifying a weakest subscriber in at least some of the monitored channels;
(c) comparing at least some of said weakest subscribers to one another according to a first predetermined criteria to determine a first subgroup of said weakest subscribers;
(d) selecting channels associated with said first subgroup of said weakest subscribers according to a second predetermined criteria to derive a second subgroup of said weakest subscribers;
(e) identifying at least one channel from said second subgroup that may be assigned to the requestor with minimal interference on the present subscribers operating on said system;
(f) assigning one of said identified channels to said requestor.

37. The method of claim 36, wherein said step (c) of comparing according to a first predetermined criteria includes comparing the received signal strength of said weakest subscribers to one another in order to find a strongest one of said weakest subscribers and a present channel associated therewith.

38. The method of claim 36, wherein said step (d) of selecting according to a second predetermined crietria includes selecting a channel on which an identified weakest subscriber exceeds a given threshold level.

39. The method of claim 37, wherein said step (f) includes the steps of:
(f1) assigning a best one of said identified channels to the requestor when a plurality of identified channels have been identified that at least meet a predetermined criteria; otherwise
(f2) delaying assigning a channel to the requestor at this time.

* * * * *